(12) United States Patent
Smith et al.

(10) Patent No.: US 7,155,574 B2
(45) Date of Patent: Dec. 26, 2006

(54) LOOK AHEAD LRU ARRAY UPDATE SCHEME TO MINIMIZE CLOBBER IN SEQUENTIALLY ACCESSED MEMORY

(75) Inventors: Peter J. Smith, Folsom, CA (US); Satish K. Damaraju, Folsom, CA (US); Subramaniam Maiyuran, Gold River, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/414,541

(22) Filed: May 1, 2006

(65) Prior Publication Data
US 2006/0218351 A1  Sep. 28, 2006

Related U.S. Application Data

(63) Continuation of application No. 10/607,979, filed on Jun. 30, 2003, now abandoned.

(51) Int. Cl.
*G06F 12/00* (2006.01)

(52) U.S. Cl. .................. 711/136; 711/118; 711/133; 711/140; 711/159; 712/227; 712/231; 712/233

(58) Field of Classification Search ............... 711/136, 711/118, 133, 140, 159; 712/227, 231, 233
See application file for complete search history.

(56) References Cited

U.S. PATENT DOCUMENTS 6,055,630 A * 4/2000 D'Sa et al. ................ 712/240
6,457,119 B1 * 9/2002 Boggs et al. ............... 712/227
6,493,797 B1 * 12/2002 Lee et al. .................. 711/118
2003/0018685 A1 * 1/2003 Kalafatis et al. ........... 709/102
2003/0018686 A1 * 1/2003 Kalafatis et al. ........... 709/102
2003/0191893 A1 * 10/2003 Miller et al. ............... 711/118

OTHER PUBLICATIONS

Black et al., "The Block-based Trace Cache," pp. 196-207, IEEE, May 4, 1999.*
Rotenberg et al., "Trace Cache: a Low Latency Approach to High Bandwidth Instruction Fetching," pp. 24-34, IEEE, Dec. 4, 1996.*

* cited by examiner

*Primary Examiner*—Stephen C. Elmore
(74) *Attorney, Agent, or Firm*—Kenyon & Kenyon LLP

(57) ABSTRACT

A high-speed memory management technique that minimizes clobber in sequentially accessed memory, including but not limited to, for example, a trace cache. The method includes selecting a victim set from a sequentially accessed memory; selecting a victim way for the selected victim set; reading a next way pointer from a trace line of a trace currently stored in the selected victim way, if the selected victim way has the next way pointer; and writing a next line of the new trace into the selected victim way over the trace line of the currently stored trace. The method also includes forcing a replacement algorithm of next set to select a victim way of the next set using the next way pointer, if the trace line of the currently stored trace is not an active trace tail line.

40 Claims, 7 Drawing Sheets

LOOK AHEAD LRU ARRAY UPDATE SCHEME TO MINIMIZE CLOBBER IN SEQUENTIALLY ACCESSED MEMORY

RELATED APPLICATION

This application is a Continuation of U.S. application Ser. No. 10/607,979, filed Jun. 30, 2003, now abandoned titled "Look Ahead LRU Array Update Scheme to Minimize Clobber in Sequentially Accessed Memory," (now abandoned), which is commonly assigned and incorporated by reference.

Field of the Invention

The present invention relates to high-speed memory management techniques. More specifically, to a memory management scheme that minimizes clobber in sequentially accessed memory, including but not limited to, for example, a trace cache.

BACKGROUND

Variable length instructions can complicate parallel decode and branch prediction, limiting instruction bandwidth and latency to the execution stage of a deeply pipelined processor. In a sequentially accessed memory, for example, a trace cache can enhance performance by storing micro-operation decoded (μop) sequences as well as implementing a better-informed branch prediction scheme. The first line of μops in a sequence (a "head") is tagged with the address of the first μop, which is used to index into the trace cache, and also is used to hold a pointer to the next line of flops in the sequence (a "body"). Each body holds a pointer to the next body, and the sequence eventually ends with a last line of μops in the sequence (a "tail") that, unlike the head and body lines, does not have a next way pointer to point to a next line of μops in the sequence. Traces can have variable lengths and a trace having a length of 1 is a special case. It is special because it contains only a single line, which is considered both a head and a tail, and the line does not have a next way pointer, that is, the next way pointer has a null value. Each line, that is, each head or body or tail, contains a fixed number of micro operations (μops), for example, eight (8) μops. High performance sequencing currently requires each head, body or tail to be in consecutive sets, and since trace sequences often contain taken branches, bodies are often "misplaced" according to their linear instruction pointer (LIP) in a set associative cache. For this reason, a trace can only be accessed through its head.

FIG. 1 is a portion of a set associative cache memory illustrating the ordering of a first trace sequence (Trace1) therein. In FIG. 1, a possible configuration of Trace1, which has a length of six (6), is shown stored in a subset of a trace cache 100. As seen in FIG. 1, trace cache 100 has a set (row), way (column) matrix structure that is read sequentially down the sets. In FIG. 1, H1 105 is used to indicate a head line of Trace1; B1 is used to indicate body lines of Trace1, for example, first body line B1 107, second body line B1 109, third body line B1 111 and fourth body line B1 113; and T1 115 is used to indicate a tail of Trace1. Next way pointer arrows 1 through 5 indicate the correct order to be followed to read the Trace1 sequence. That is, the Trace1 sequence is read by starting from H1 105 in set 1, way 1 to B1 107 in set 2, way 0 (arrow 1); from B1 107 in set 2, way 0 to B1 109 in set 3, way 1 (arrow 2); from B1 109 in set 3, way 1 to B1 111 in set 4, way 1 (arrow 3); from B1 111 in set 4, way 1 to B1 113 in set 5, way 3 (arrow 4); and B1 113 in from set 5, way 3 to T1 115 in set 6, way 3 (arrow 5).

Victim way selection in sequentially accessed memories, generally, uses a least recently used (LRU) algorithm to select a next victim way in the next set in the memory. When the LRU algorithm selects a victim way to be overwritten that holds a part of another active trace, it is called a trace "clobber."

FIG. 2 illustrates the cache memory of FIG. 1 having a second trace sequence having partially overwritten (clobbered) the first trace sequence from FIG. 1 using an existing replacement algorithm. In FIG. 2, B1 109 of Trace1 has been clobbered by body line B8 210 of Trace8 in set 3, way 1. Although the first 2 lines of Trace1 can still be accessed through H1 105 in set 1, way 1, the last 3 lines, that is, B1 111 in set 4, way 1, B1 113 in set 5, way 3 and T1 115 in set 6, way 3, are no longer accessible by the selection algorithm, since the remaining sequence does not have a head. In FIG. 2, the LRU algorithm selected set 4 way 0 for a tail of Trace8, T8 215. Next way pointer arrows (21 and 22) indicate the way in the next set that each points to and the correct order to be followed to read the sequence of Trace8. That is, the sequence of Trace8 runs from H8 205 in set 2, way 2 to B8 210 in set 3, way 1 (arrow 21), and from B8 210 in set 3, way 1 to T1 115 in set 4, way 4 (arrow 22). Accordingly, the next time an attempt to read Trace1 occurs, a trace cache miss will result when attempting to read B1 109 in set 3, way 1 from B1 107. This will most likely decrease the trace cache utilization due to duplication of the orphaned bodies and tail of Trace1. Therefore, there is a need to decrease the number of clobbers and, thus, achieve better overall performance.

DETAILED DESCRIPTION

Victim way selection may be improved in sequentially accessed memory structures, and thus processor performance, by overriding an existing victim way selection replacement algorithm in the memory by following a clobbered active trace after an initial clobber to write the rest of a new trace over the orphaned body of the clobbered trace. This may prevent the lock-step use of the victim way selection replacement algorithm, which may potentially result in a clobber of other active traces.

Figure 2:
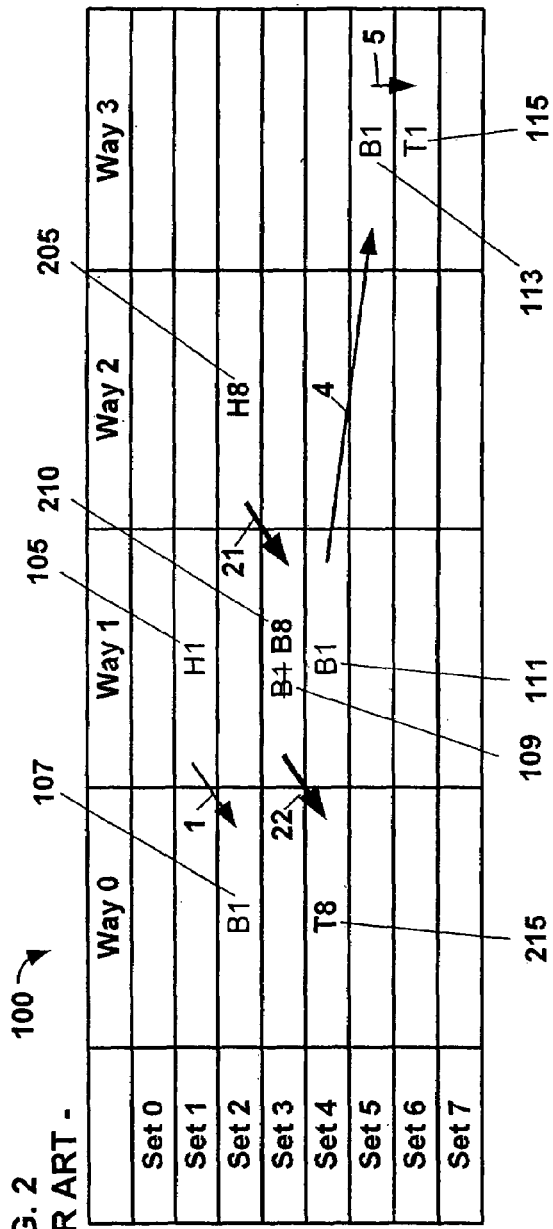
FIG. 2 illustrates the cache memory of FIG. 1 having a second trace sequence having partially overwritten the first sequence from FIG. 1 using an existing replacement algorithm.
Figure 3:
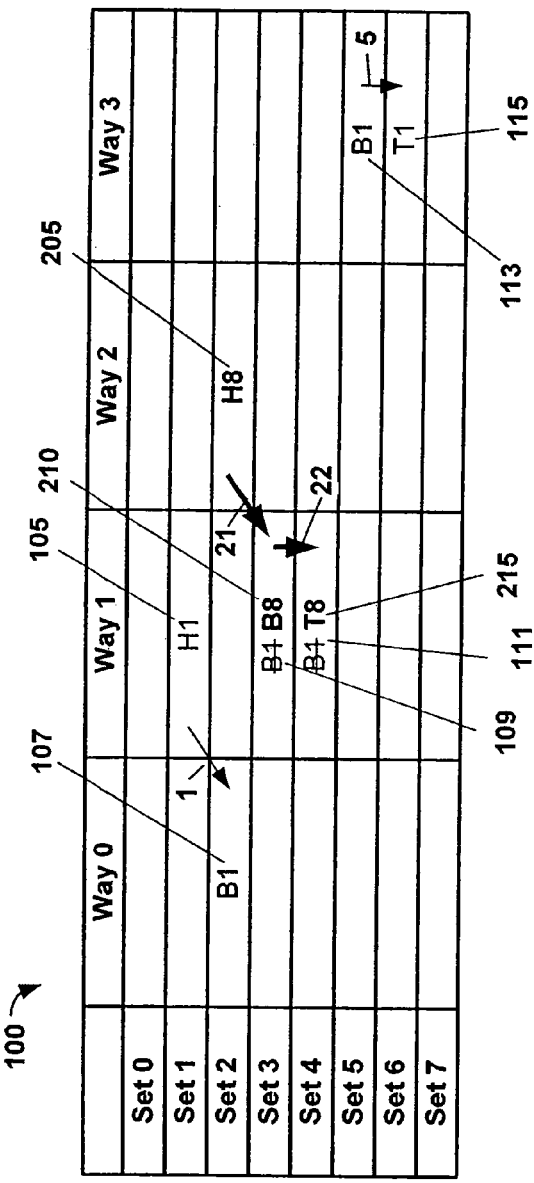
FIG. 3 is a portion of a cache memory of FIG. 2 showing the end lines of the second trace sequence partially overwriting sequential lines in the first trace sequence, in accordance with an embodiment of the present invention.

FIG. 3 is the portion of the cache memory of FIG. 2 showing the end lines of the second trace sequence partially overwriting sequential lines in the first trace sequence, in accordance with an embodiment of the present invention. In FIG. 3, a head of Trace8 (H8) 205 may be written into trace cache 100 in, for example, set 2, way 2, where the set 2, way 2 location may be specified by an existing victim way selection replacement algorithm, for example, the LRU algorithm. Although, in general, the victim way selection replacement algorithm may be implemented as an LRU algorithm, other algorithms are also possible, including but not limited to, a pseudo LRU or a random selection algorithm.

In FIG. 3, the victim way in the next set, that is, set 3, may be that specified by the implemented victim way selection replacement algorithm, which, in FIG. 3, may be way 1. As a result, the "next way" pointer of H8 205 (arrow 21) may be set to indicate set 3, way 1 and a body line 210 of Trace8 (B8) may clobber B1 109 from Trace1 in set 3, way 1. As part of clobbering B1 109, the next way pointer value to B1 111 (arrow 3 in FIG. 1) of set 4, way 1 may be read out of B1 109 and used as the next way pointer of B8 210 (arrow 22) and used to set the victim way in the next set in which to write the next and last line of Trace8, a tail line T8 215. Specifically, the implemented victim way selection replacement algorithm may be over-ridden in set 4 using the next way pointer from B1 109. For example, the existing replacement way based on the replacement algorithm for set 4 may be re-set to be the way specified by the next way pointer read-out from B1 109. Therefore, in FIG. 3, the next way pointer from B1 109 may indicate that way 1 is to be used for set 4 and T8 215 may clobber B1 111 in set 4, way 1.

Figure 4:
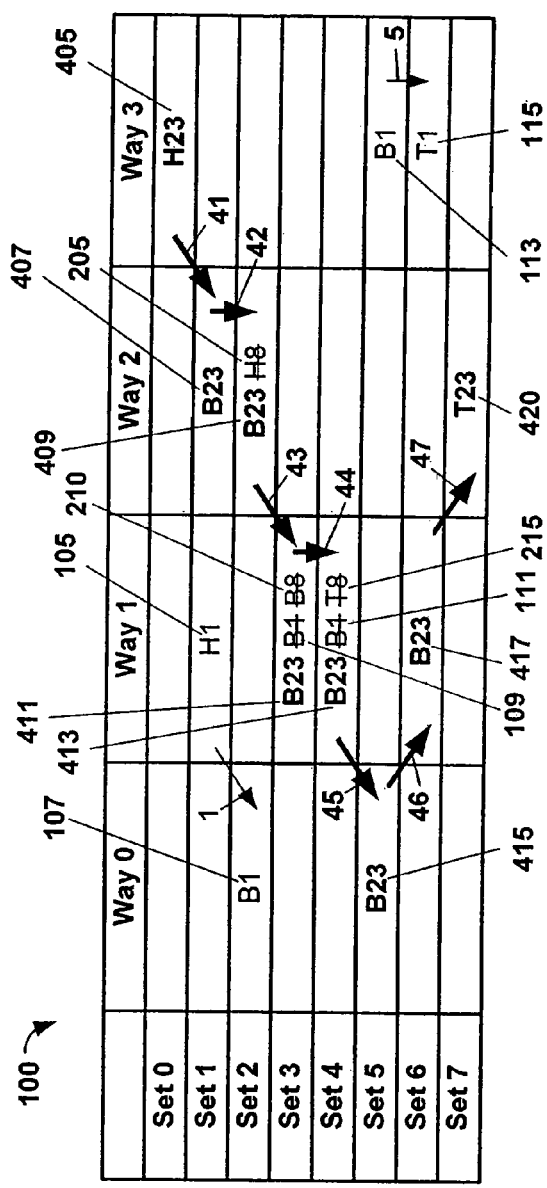
FIG. 4 is the portion of the cache memory of FIG. 3, showing a third trace sequence overwriting the entire second trace sequence, in accordance with an embodiment of the present invention.

FIG. 4 is the portion of the cache memory of FIG. 3, showing a third trace sequence overwriting the entire second trace sequence, in accordance with an embodiment of the present invention. In FIG. 4, a third trace (Trace23) sequence is shown having completely overwritten the Trace8 sequence (H8 205, B8 210 and T8 215) using the follow clobber method described above in relation to FIG. 3 after initially clobbering H8 205 of Trace8. However, according to the embodiment, after Trace23 overwrites T8 215, it returns to using the victim way selection replacement algorithm to select a victim way in each of sets 5, 6, and 7. As a result, the sequence of Trace23 may run from a head (H23) 405 in set 0, way 3 to a first body (B23) 407 in set 1, way 2 (arrow 41) and to a second body (B23) 409 in set 2, way 2 (arrow 42) where B23 409 clobbers H8 205 from Trace8. Victim way selection for H23 405, B23 407 and B23 409 may be accomplished using the victim way selected by the victim way selection replacement algorithm for the next set. During the clobber of H8 205 the next way pointer (arrow 43) may be read from H8 205 and used to set (override) the victim way for the next set that, generally, may already have been specified by the victim way selection replacement algorithm, and saved as the next way pointer for B23 409.

In FIG. 4, Trace23 may continue from B23 409 in set 2, way 2 to a third body (B23) 411 in set 3, way 1 (arrow 43) where B23 411 clobbers B8 210. As part of the clobber of B8 210, as with the clobber of H8 205, the next way pointer of B8 210 may be read and used to set (override) the victim way for the next set that, generally, may already have been specified by the victim way selection replacement algorithm, and saved as the next way pointer for B23 411. Trace23 may continue from B23 411 in set 3, way 1 to a fourth body (B23) 413 in set 4, way 1 (arrow 44) where B23 413 clobbers T8 215. However, unlike the clobbers of H8 205 and B8 210, during the clobber of T8 215, since T8 215 is a tail line and does not, generally, contain a next way pointer, no next way pointer may be read from T8 215. Instead, the victim way for the next set, which, generally, may already have been specified by the victim way selection replacement algorithm, may be obtained and saved as the next way pointer for B23 413. Trace23 may continue from B23 413 in set 4, way 1 to a fifth body (B23) 415 in set 5, way 0 (arrow 45) where B23 415 may be written, as specified by the next victim way and the next way pointer for B23 413. Trace23 may complete writing the remaining two lines and save their respective pointers using the same procedure as described above for B23 413 and B23 415 to move from B23 415 in set 5, way 0 to a sixth body (B23) 417 in set 6, way 1 (arrow 46), and, finally, from B23 417 in set 6, way 1 to a tail (T23) 420 in set 7, way 2 (arrow 47).

In FIG. 4, although the orphaned lines B1 113 and T1 115 from Trace1 are not shown as being overwritten by Trace23, they could just as easily have been overwritten if the victim way selection replacement algorithm had specified way 3 of set instead of way 0. In fact, it may, generally, be desirable to have orphaned lines of unrelated traces overwritten, that is, clobbered, by new trace lines as they are being read into trace cache 100. Doing so may prevent the new trace that is being read in from clobbering other active traces in trace cache 100. For example, if any of set 5, way 0 or set 6, way 1 or set 7, way 2 had contained a line of a still active trace it may have been overwritten by B23 415, B23 417 or T23 420. Being able to follow the orphaned sets of previously clobbered traces, for example, B1 113 and T1 115 of Trace1 may further improve the performance of trace cache 100. Unfortunately, since the "next way" pointer for B1 111, which pointed to B1 113, was invalidated when T8 215 clobbered B1 111 in set 4, way 1, this example does not know that Trace8 originally clobbered a longer trace and left orphaned lines (B1 113 and T1 115) from Trace1.

Figure 5:
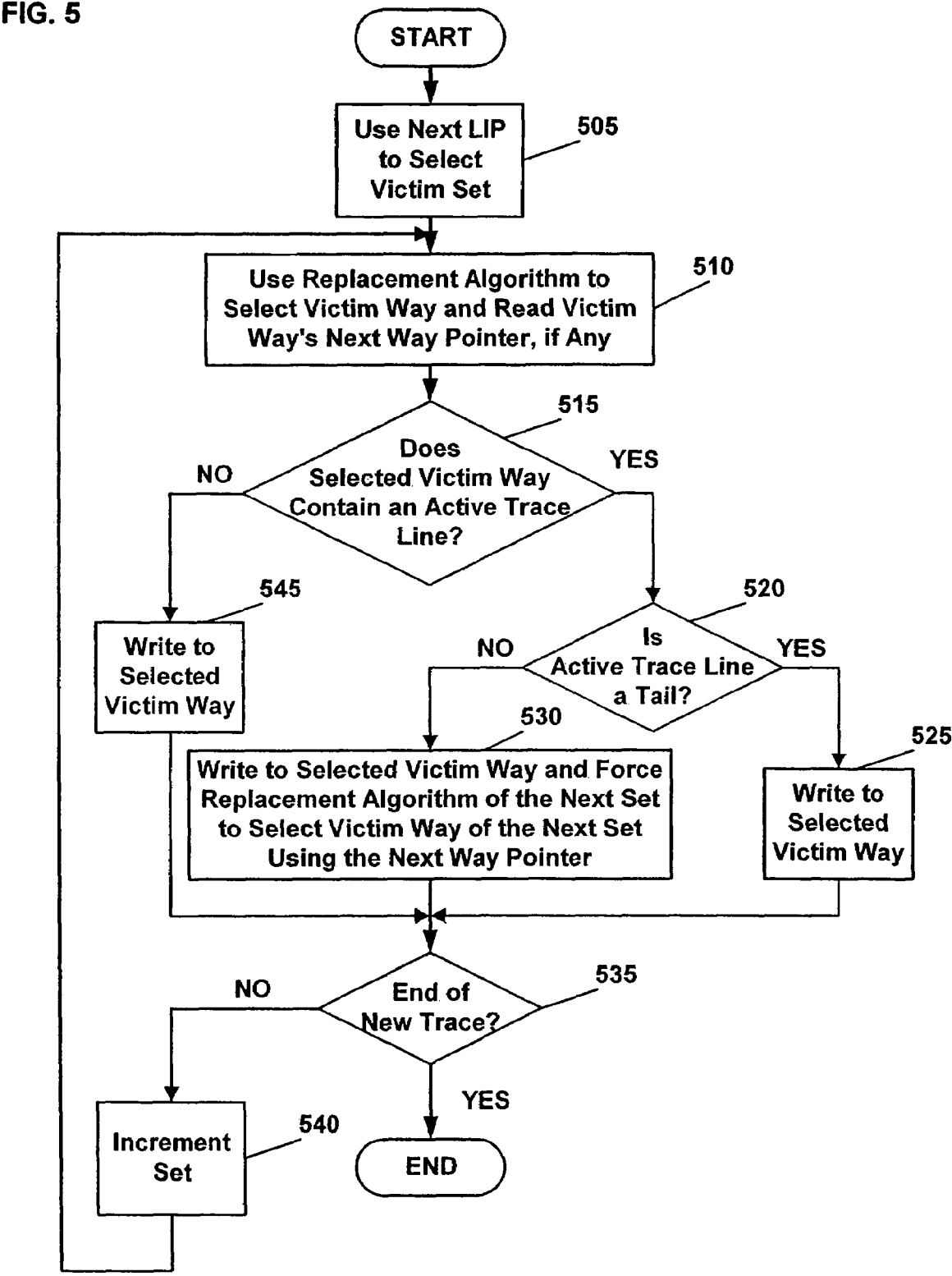
FIG. 5 is a flow diagram of a method for updating a sequentially accessed memory to minimize clobber of active traces in the memory, in accordance with an embodiment of the present invention.

In accordance with an embodiment of the present invention, the previously described follow algorithm of FIG. 3 may be further improved so that it may remember and thus access orphaned lines from previously clobbered traces that may still remain in the memory. FIG. 5 is a flow diagram of a method for updating a sequentially accessed memory to minimize clobber of active traces in the memory, in accordance with an embodiment of the present invention.

In FIG. 5, when a new trace is being read into a memory, for example, trace cache 100, the next line instruction pointer (LIP) may be read from trace cache 100 and used to select (505) the next victim set in trace cache 100 that is to be used. A victim way replacement algorithm, for example, an LRU algorithm, may be used to select (510) a victim way from the selected victim set and may read a next way pointer value from the selected (510) victim way in trace cache 100, if available. The method may determine (515) whether the selected victim way contains an active trace line. If the selected victim way is determined (515) to contain the active trace line, whether the active trace line is a tail may be determined (520). If the active trace line is determined (520) to be a tail, the method may write (525) the incoming trace line to the selected (510) victim way in trace cache 100, and whether the incoming trace line is the end of the incoming trace may be determined (535). If the incoming trace line is determined (535) not to be the end of the incoming trace, the method may increment (540) a set value, for example, the next LIP, to indicate the next victim set and may loop back to select (510) a new victim way from the next victim set in trace cache 100 and read a next way pointer value from the selected (510) victim way and continue with the method.

In FIG. 5, if the active trace line is determined (520) not to be a tail, the method may write (530) the incoming trace line to the selected (510) victim way in trace cache 100 and force (530) the replacement algorithm of the next set to select the victim way of the next set using the next way pointer value of the active trace line. Whether the incoming trace line is the end of the incoming trace may be determined (535) and, if the incoming trace line is determined (535) not to be the end of the incoming trace, the method may increment (540) a set value, for example, the next LIP, to indicate the next victim set and the method may loop back to select (510) a new victim way from the next victim set in trace cache 100 and read a next way pointer value from the selected (510) victim way and continue with the method.

In FIG. 5, if the selected victim way is determined (515) not to contain an active trace line, the method may write (545) the incoming trace line to the selected (510) victim way in trace cache 100. Whether the incoming trace line is the end of the incoming trace may be determined (535) and, if the incoming trace line is determined (535) not to be the end of the incoming trace, the method may increment (540) a set value, for example, the next LIP, to indicate the next victim set and the method may loop back to select (510) a new victim way from the next victim set in trace cache 100 and read a next way pointer value from the selected (510) victim way and continue with the method.

In FIG. 5, regardless of whether an active trace is contained (515) in the selected (510) victim way in trace cache 100, if it is determined (535) that the end of the incoming trace has been reached, the method may terminate.

Figure 6:
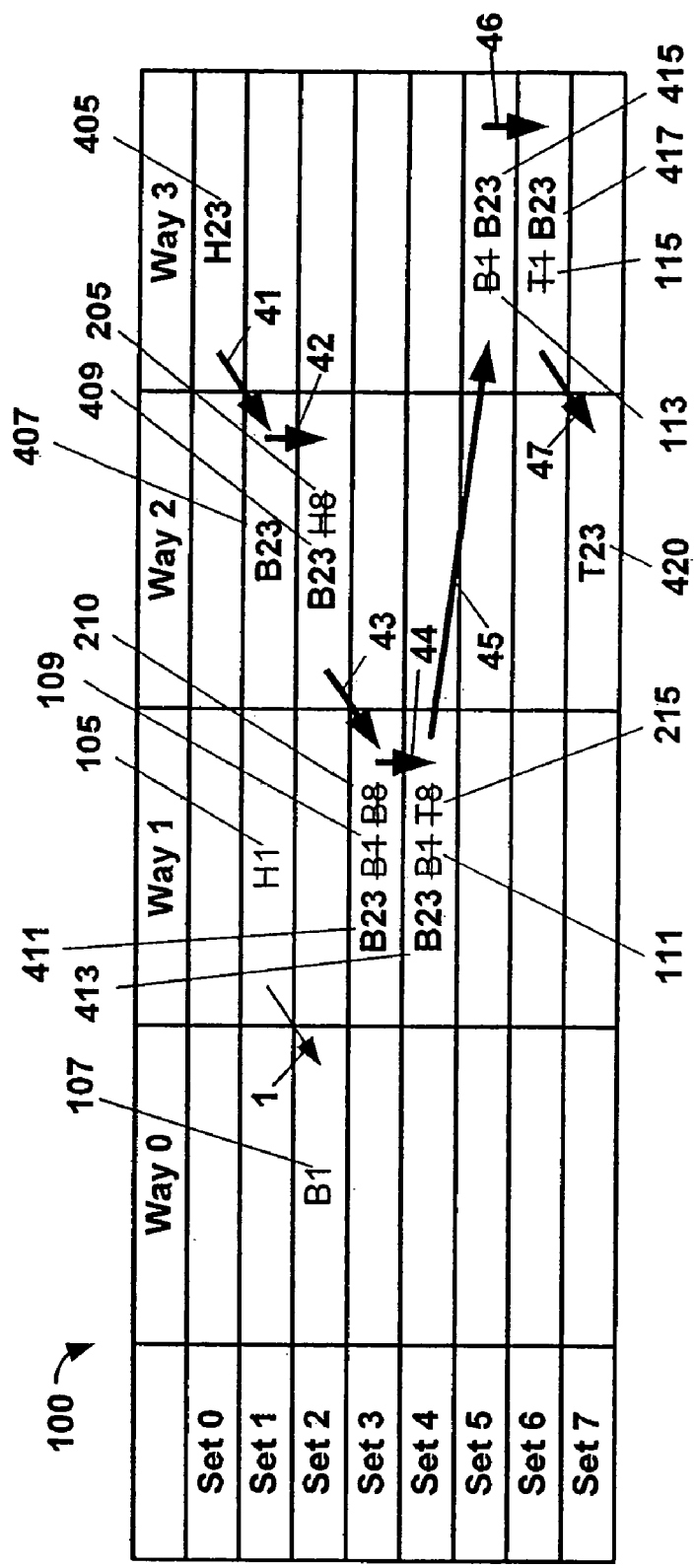
FIG. 6 is the portion of the cache memory of FIG. 3, showing the third trace sequence now overwriting the entire second trace sequence and the orphaned trace lines from the first trace, in accordance with an embodiment of the present invention.

FIG. 6 illustrates the portion of the trace cache 100 of FIG. 3, showing how the third trace sequence was written into trace cache 100 using the method described in FIG. 5, in accordance with an embodiment of the present invention. In FIG. 6, in accordance with an embodiment of the present invention, a replacement algorithm, for example, an LRU algorithm, may be implemented to control the selection of next victim ways. In FIG. 6, H23 405 and B23 407 may be written (545) into their respective sequential victim set, way locations in trace cache 100 using the LRU algorithm, according to the method of FIG. 5, since neither victim way location contained an active trace line.

In FIG. 6, when B23 409 clobbers H8 205, the next way pointer value of H8 205 may be read (510), B23 409 may be written (530) over H8 205 and the replacement algorithm of the next set, that is, set 3, may be forced (530) to select its victim way to be way 1 using the next way pointer value of H8 205. B23 411 may follow Trace8, since the replacement algorithm of set 3 was just forced (530) to way 1 when B23 409 clobbered H8 205, and B23 411 may clobber B8 210 in set 3, way 1. Similar to B23 409, B23 411 may clobber B8 210 and force (530) the replacement algorithm way of set 4 to be equal to the next way pointer of B8 210, which is way 1. In FIG. 6, B23 413 may clobber T8 215, since the replacement algorithm way of set 4 was forced (530) to way 1 by the previous clobber. However, since T8 215 is the tail of Trace8, the next way pointer of T8 215 may not be read and/or used to force (530) the replacement algorithm way of set 5. Fortunately, since the replacement algorithm was also used when Trace8 clobbered Trace1, the replacement algorithm way of set 5 was already forced (530) to way 3 when T8 215 clobbered B1 111 and read and used the next way pointer in B1 111. Thus, when B23 415 is written (530) into trace cache 100, it may use the replacement algorithm way of set 5 to select and clobber B1 113 in set 5, way 3. Since B1 113 is not a tail, the next way pointer may be read (510) from B1 113 and may be used to force (530) the replacement algorithm way of set 6 to be equal to way 3. In FIG. 6, B23 417 may be written (530) into trace cache 100 and clobber T1 119 in set 6, way 3, since the replacement algorithm way of set 6 was previously forced (530) to equal way 3. Similar to when B23 413 clobbered T8 215 in set 4, way 1, since T1 119 is the tail of Trace 1, no next way pointer from T1 119 may be read and used to force (530) the replacement algorithm way of set 7. Therefore, the replacement algorithm way in set 6 may be the way specified by the replacement algorithm, which, according to the embodiment in FIG. 6, may be way 2. Therefore, T23 420 may be written (545) into trace cache 100 in set 7, way 2 and, since T23 420 is the end of Trace23, the writing of Trace23 into trace cache 100 may end.

It should be noted that had Trace23 started to be written into trace cache 100 in set 5 instead of set 1, in accordance with the embodiment in FIG. 6, the replacement algorithm would have correctly chosen the orphaned trace line in way 3 in set 5. This being the result of the previous forcing (530) of the replacement algorithm way of set 5 to be equal to the next way pointer of B1 111 when it was clobbered by T8 215.

Although the original follow clobber algorithm described in FIG. 3 generally results in performance gains over the standard LRU replacement algorithm, because it reduces the frequency of clobbers over the standard LRU algorithm, the improved algorithm of FIG. 5 may result in even better performance gains over the standard LRU algorithm. This may occur because the improved algorithm may force the replacement algorithm way of the next set to be equal to the next way pointer of the clobbered line in the prior set. As a result, new traces may be written into trace cache 100 to clobber sequential trace lines from one or more clobbered traces. As noted above, this embodiment of the algorithm also correctly victimizes orphaned traces immediately following any of the clobbered traces tails (opens multiple entry points on a long multi-clobbered inactive trace). The performance increase by forcing the replacement algorithm of the next set is roughly equivalent to increasing the size of trace cache 100 from 16 KB to 20 KB, with minimal design impact.

Figure 7:
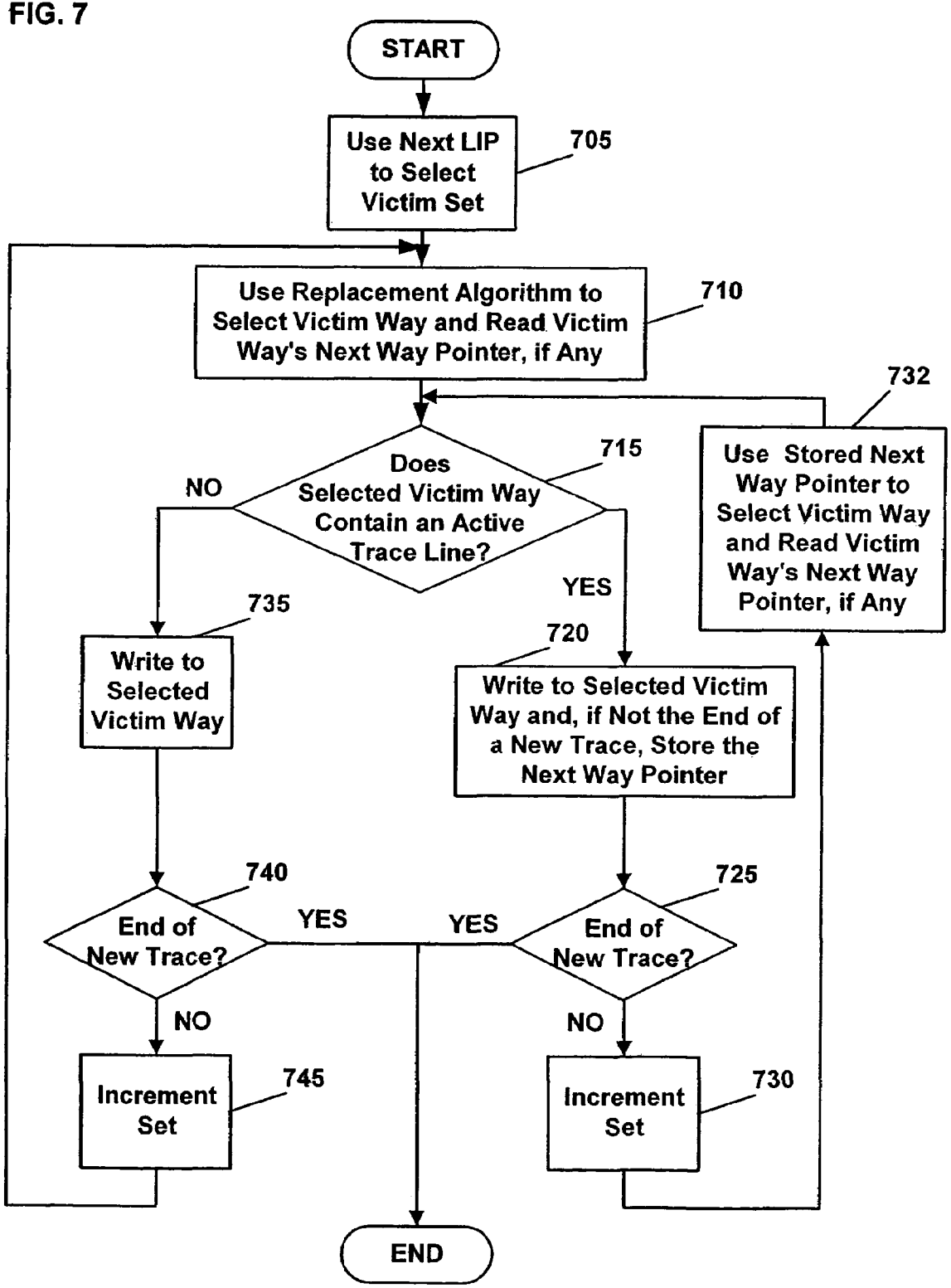
FIG. 7 is a flow diagram of another method for updating a sequentially accessed memory to minimize clobber of active traces in the memory, in accordance with an embodiment of the present invention.

FIG. 7 is a flow diagram of a method for updating a sequentially accessed memory to minimize clobber of active traces in the memory, in accordance with an embodiment of the present invention. Specifically, FIG. 7 is a flow diagram of the follow algorithm described in FIG. 3. In FIG. 7, when a new trace is being read into a memory, for example, trace cache 100, the next LIP may be read from trace cache 100 and used to select (705) the next victim set that is to be used. A victim way replacement algorithm, for example, an LRU algorithm, may be used to select (710) a victim way from the selected (705) victim set and read (710) a next way pointer value from the selected (710) victim way in trace cache 100. The method may determine (715) whether the selected victim way contains an active trace line. If the selected victim way is determined (715) to contain the active trace line, the method may write (720) the incoming new trace line to the selected (710) victim way in trace cache 100, and, if the new trace line is not the end (that is, the tail) of the new trace, the method may store (720) the next way pointer. For example, the next way pointer may be temporarily stored in a register in a processor associated with the sequentially accessed memory. Whether the end of the new trace has been reached may be determined (725). If the incoming trace line is determined (725) to not be the end of the incoming trace, the method may increment (730) a set value, for example, the next LIP, to indicate the next set and use the stored next way pointer to select (732) a new victim way from the next victim set in trace cache 100 and read a next way pointer value from the selected (732) victim way. The method may loop back to determine (715) whether the selected (732) victim way contains an active trace line and the method may continue.

In FIG. 7, if the selected victim way is determined (715) not to contain an active trace line, the method may write (735) the incoming trace line to the selected (710) victim way in trace cache 100. Whether the incoming trace line is the end of the incoming trace may be determined (740) by the method and, if the incoming trace line is determined (740) not to be the end of the incoming trace, the method may increment (745) a set value, for example, the next LIP, to indicate the next set and the method may loop back to select (710) a new victim way from the next victim set in trace cache 100 using the replacement algorithm and read a next way pointer value from the selected (710) victim way and continue with the method.

In FIG. 7, regardless of whether an active trace is determined (715) to be in the selected (710) victim way in trace cache 100, if it is determined (725, 740) that the end of the incoming trace has been reached, the method may terminate.

Figure 1:
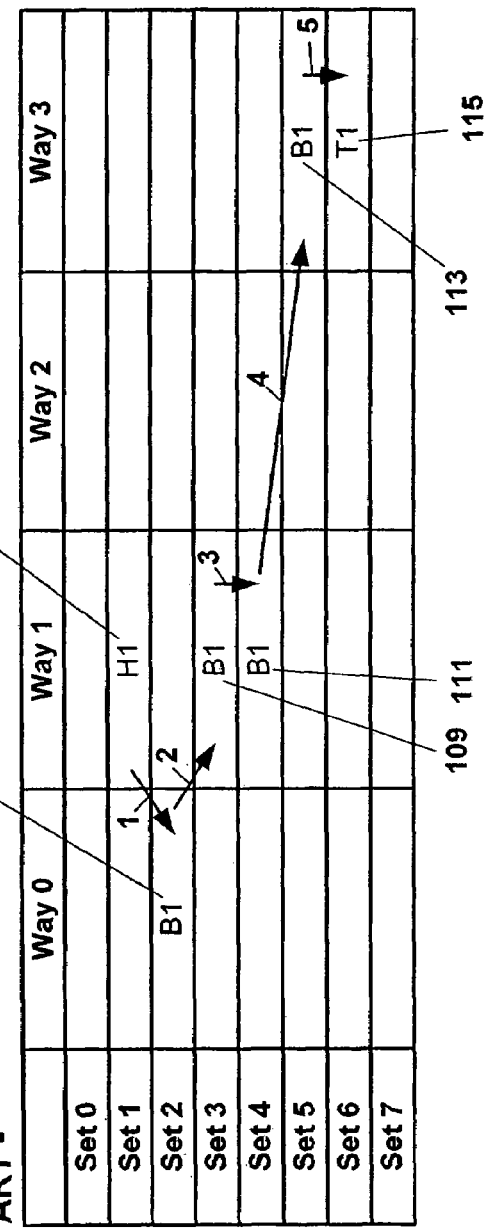
FIG. 1 is a portion of a set associative cache memory illustrating a first trace sequence therein.
Figure 8:
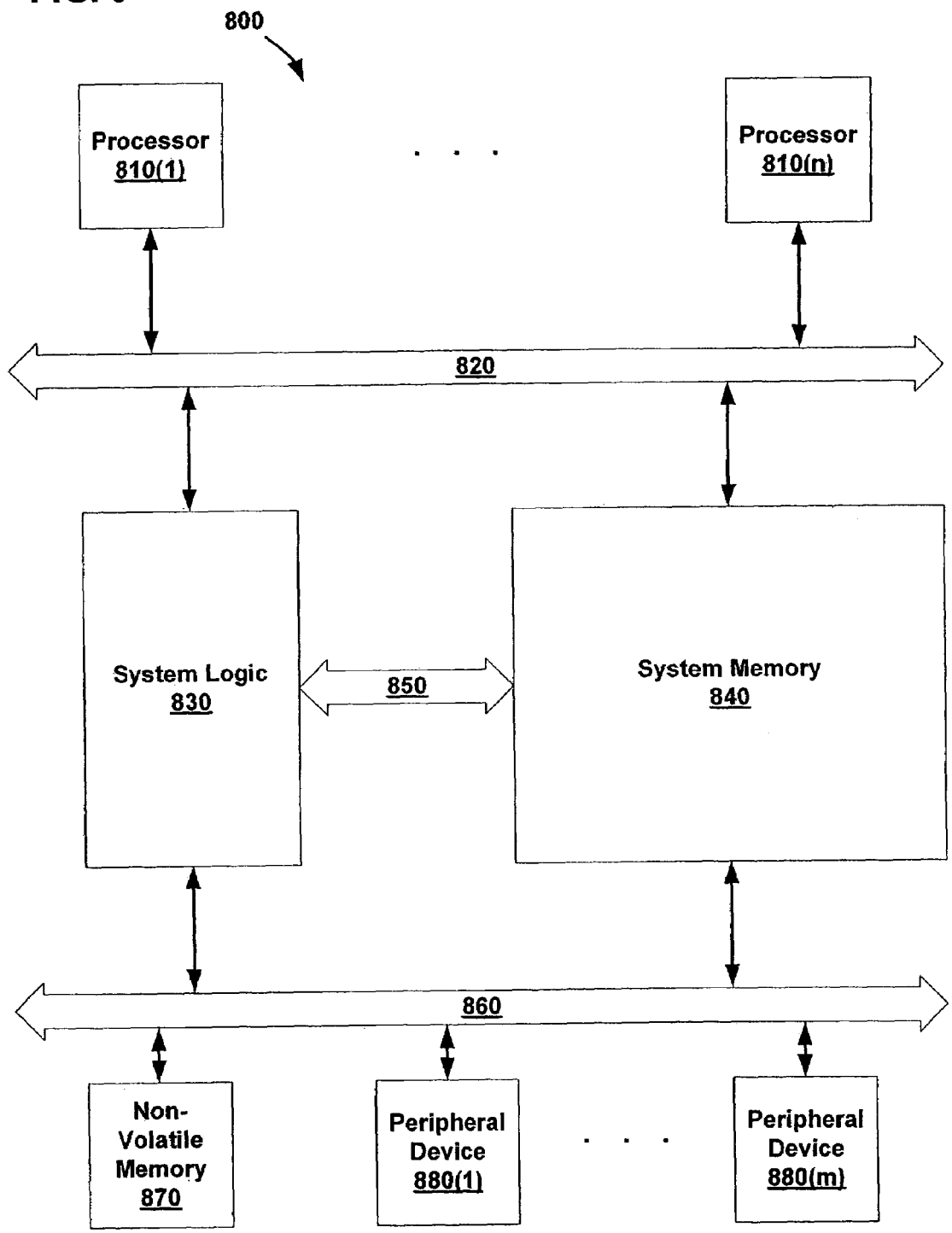
FIG. 8 is a block diagram of a computer system, which includes an architectural state, including one or more processors, registers and memory for use in accordance with an embodiment of the present invention.

FIG. 8 is a block diagram of a computer system, which includes an architectural state, including one or more processors, registers and memory for use in accordance with an embodiment of the present invention. In FIG. 1, a computer system 800 may include one or more processors 810(1)–810(n) coupled to a processor bus 820, which may be coupled to a system logic 830. Each of the one or more processors 810(1)–810(n) may be N-bit processors and may include a decoder (not shown) and one or more N-bit registers (not shown). System logic 830 may be coupled to a system memory 840 through a bus 850 and coupled to a non-volatile memory 870 and one or more peripheral devices 880(1)–880(m) through a peripheral bus 860. Peripheral bus 860 may represent, for example, one or more Peripheral Component Interconnect (PCI) buses, PCI Special Interest Group (SIG) PCI Local Bus Specification, Revision 2.2, published Dec. 18, 1998; industry standard architecture (ISA) buses; Extended ISA (EISA) buses, BCPR Services Inc. EISA Specification, Version 3.12, 1992, published 1992; universal serial bus (USB), USB Specification, Version 1.1, published Sep. 23, 1998; and comparable peripheral buses. Non-volatile memory 870 may be a static memory device such as a read only memory (ROM) or a flash memory. Peripheral devices 880(1)–880(m) may include, for example, a keyboard; a mouse or other pointing devices; mass storage devices such as hard disk drives, compact disc (CD) drives, optical disks, and digital video disc (DVD) drives; displays and the like.

Figure 9:
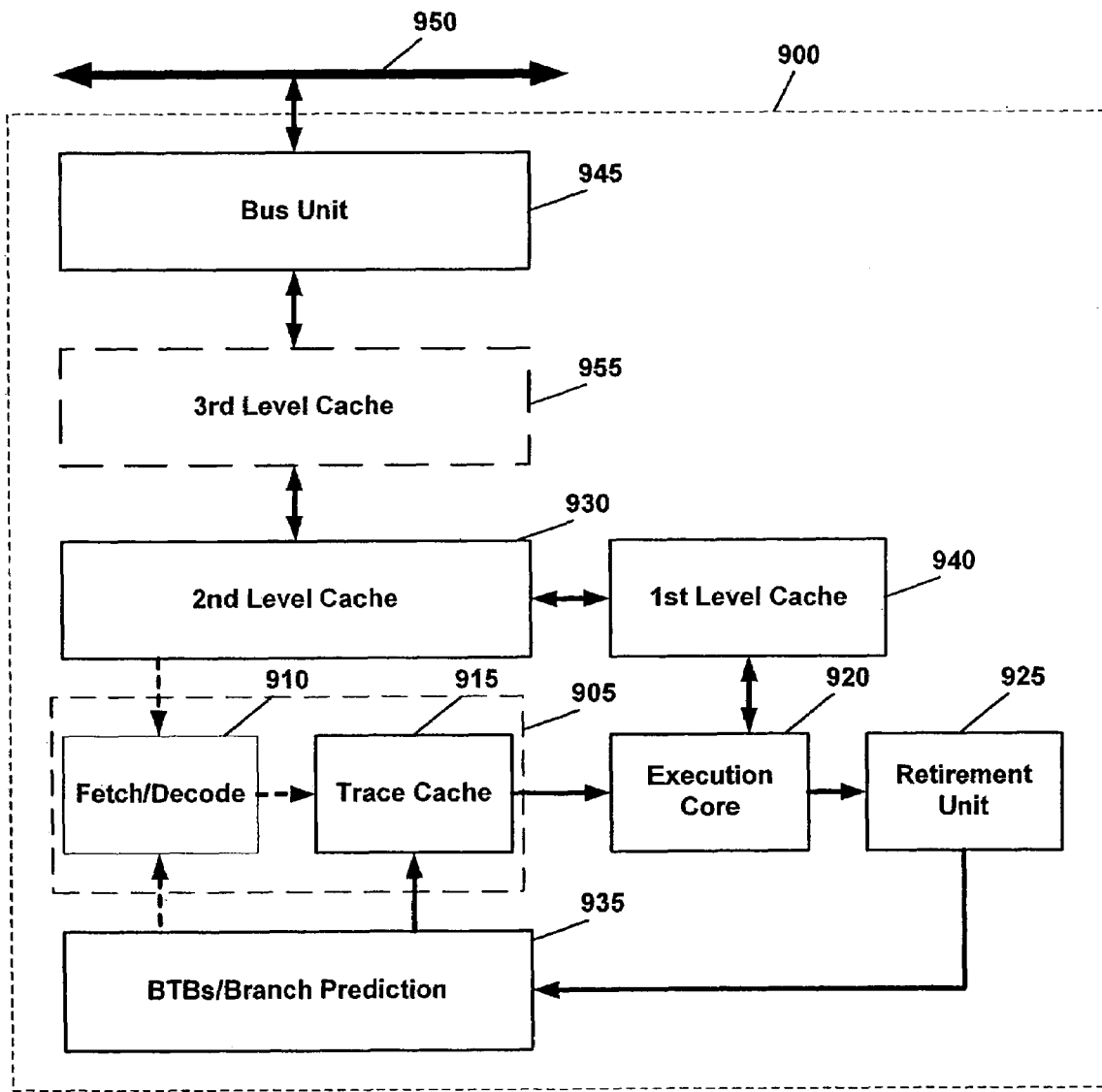
FIG. 9 is a detailed block diagram of a processor structure for the processing system of FIG. 8 having a sequentially accessed trace cache architecture for use in accordance with an embodiment of the present invention.

FIG. 9 is a detailed block diagram of a processor structure for the processing system of FIG. 8 having a sequentially accessed trace cache architecture for use in accordance with an embodiment of the present invention. In FIG. 9, embodiments of the present invention may operate in a microarchitecture pipeline, which may include three sections: an in-order issue front end 905, an out-of-order superscalar execution core 920, and an in-order retirement unit 925.

In FIG. 9, front end 905 may supply instructions in program order to out-of-order execution core 920, which may have a very high execution bandwidth that, for example, may execute basic integer operations with 1/2 clock cycle latency. Front end 905 may fetch and decode instructions, and also break down the instructions into simple operations called micro-ops (μops). Front end 905 may issue multiple μops per cycle, in original program order, to out-of-order execution core 920.

In FIG. 9, front end 905 may perform several basic functions, for example: prefetch instructions that are likely to be executed; fetch instructions that have not already been prefetched; decode the instructions into micro-operations; generate microcode for complex instructions and special-purpose code; deliver decoded instructions from the execution trace cache; and predict branches. Front end 905 may include a fetch/decode unit 910 coupled to a trace cache 915. Fetch/decode unit 910 may also be coupled to a second-level cache memory 930 to retrieve instructions from second-level cache 930. Fetch/decode unit 910 may also be coupled to a branch prediction component 935. Trace cache 915 may be coupled to branch prediction component 935 and to execution core 920.

In FIG. 9, execution trace cache 915 may store decoded instructions that may be fetched and decoded by and built into sequences of μops to form the traces. These traces of μops may be stored in trace cache 915. The instructions from the most likely target of a branch may immediately follow the branch without regard for contiguity of instruction address. Once a trace is built, trace cache 915 may be searched for the instruction that follows that trace. If that instruction appears as the first instruction in an existing trace the fetch and decode of instructions from the memory hierarchy may cease and the trace cache may become the new source of instructions. The critical execution loop in the micro-architecture in FIG. 9 may include fetch/decode unit 910, trace cache 915, execution core 920, retirement unit 925 and branch prediction hardware 935.

Branch targets may be predicted based on their linear addresses using branch target buffers (BTBs) in branch prediction hardware 935 and fetched as soon as possible. Branch targets may be fetched from trace cache 915, if they are indeed cached there, otherwise they may be fetched from the memory hierarchy. The branch prediction information may be used to form traces along the most likely paths.

In FIG. 9, execution core's 920 ability to execute instructions out of order is a key factor in enabling parallelism. This feature may enable processor 900 to reorder instructions so that if one μop is delayed while waiting for data or a contended execution resource, other μops that are later in program order may proceed around it. Processor 900 may employ several buffers to smooth the flow of μops. This may imply that when one portion of the pipeline experiences a delay, that delay may be covered by other operations executing in parallel or by the execution of μops which were previously queued up in a buffer.

In FIG. 9, execution core 920 may facilitate parallel execution. In fact, execution core 920 may exceed the trace cache and retirement μop bandwidth. However, most pipelines may start executing a new μop every cycle, so that several instructions may be in flight at a time for each pipeline. For example, a number of arithmetic logical unit (ALU) instructions may start two per cycle, and many floating-point instructions may start one every two cycles. Finally, μops may begin execution, out of order, as soon as their data inputs are ready and resources are available.

In FIG. 9, retirement unit 925 may receive the results of the executed μops from execution core 920 and may process the results so that the proper architectural state may be updated according to the original program order. For semantically-correct execution, the results of instructions must be committed in original program order before it is retired. Exceptions may be raised as instructions are retired. Thus, exceptions may not occur speculatively, but rather in the correct order, and the machine may be correctly restarted after an exception.

In FIG. 9, when a μop completes it may write its result to the destination and may be retired by retirement unit 925. Up to three μops may be retired per cycle. A Reorder Buffer (ROB) may be a unit in the processor that buffers completed μops, updates the architectural state in order, and manages the ordering of exceptions. Retirement unit 925 may also keep track of branches and send updated branch target information to the BTB to update branch history. In this manner, traces that are no longer needed may be purged from trace cache 915 and new branch paths may be fetched, based on updated branch history information.

In FIG. 9, execution core 920 may also be coupled to a first level cache memory 940, which may be coupled to a second-level cache memory 930 to retrieve data and instructions. Second-level cache memory 930 may be further coupled to a bus unit 945, which may couple processor 900 to a main system bus 950 in a computer system to which processor 900 may be coupled. Optionally, a third-level cache 955 may be coupled between second-level cache 930 and bus unit 945.

Several embodiments of the present invention are specifically illustrated and described herein. However, it will be appreciated that modifications and variations of the present invention are covered by the above teachings and within the purview of the appended claims without departing from the spirit and intended scope of the invention.

What is claimed is:

1. A method comprising:
   selecting a victim set from a sequentially accessed memory;
   selecting a victim way for said selected victim set;
   reading a next way pointer from a trace line of a trace currently stored in said selected victim way, if said selected victim way has said next way pointer;
   writing a line of said new trace into said selected victim way over said trace line of said currently stored trace; and
   forcing a replacement algorithm of a next victim set to select a next victim way for the next victim set using said next way pointer, if said trace line of said currently stored trace is not an active trace tail line.

2. The method of claim 1 wherein selecting said victim set comprises:
   selecting said victim set using a next line instruction pointer.

3. The method of claim 1 wherein selecting said victim way for said selected victim set comprises:
   selecting said victim way using a predetermined replacement algorithm.

4. The method of claim 3 wherein selecting said victim way using said predetermined replacement algorithm comprises:
   selecting said victim way using a least-recently used (LRU) replacement algorithm.

5. The method of claim 1 further comprising:
   incrementing to a next selected victim set, unless said line is a last line in said new trace.

6. The method of claim 1 wherein selecting said victim set from said sequentially accessed memory comprises:
   selecting said victim set from a sequentially accessed trace cache.

7. The method of claim 6 wherein selecting said victim set from said sequentially accessed trace cache comprises:
   selecting said victim set from a plurality of victim sets in said sequentially accessed trace cache using a next line instruction pointer.

8. A machine-readable medium having stored thereon a plurality of executable instructions to perform a method comprising:
   selecting a victim set from a sequentially accessed memory;
   selecting a victim way for said selected victim set;
   reading a next way pointer from a trace line of a trace currently stored in said selected victim way, if said selected victim way has said next way pointer;
   writing a next line of said new trace into said selected victim way over said trace line of said currently stored trace; and
   forcing a replacement algorithm of a next victim set to select a next victim way for the next victim set using said next way pointer, if said trace line of said currently stored trace is not an active trace tail line.

9. The machine-readable medium of claim 8 wherein selecting said victim set comprises:
   selecting said victim set using a next line instruction pointer.

10. The machine-readable medium of claim 8 wherein selecting said victim way for said selected victim set comprises:
    selecting said victim way using a predetermined replacement algorithm.

11. The machine-readable medium of claim 10 wherein selecting said victim way using said predetermined replacement algorithm comprises:
    selecting said victim way using a least-recently used (LRU) replacement algorithm.

12. The machine-readable medium of claim 8 further comprising:
    incrementing to a next selected victim set, unless said line is a last line in said new trace.

13. The machine-readable medium of claim 8 wherein selecting said victim set from said sequentially accessed memory comprises:
    selecting said victim set from a sequentially accessed trace cache.

14. The machine-readable medium of claim 13 wherein selecting said victim set from said sequentially accessed trace cache comprises:
    selecting said victim set from a plurality of victim sets in said sequentially accessed trace cache using a next line instruction pointer.

15. A method comprising:
   selecting a victim set from a sequentially accessed memory;
   selecting a victim way for said selected victim set;
   reading a next way pointer from a trace line of a trace currently stored in said selected victim way, if said selected victim way has said next way pointer;
   writing a next line of said new trace into said selected victim way over said trace line of said currently stored trace; and
   storing said next way pointer, if said next line of said new trace is not a last line of said new trace.

16. The method of claim 15 wherein selecting said victim set comprises:
   selecting said victim set using a next line instruction pointer.

17. The method of claim 15 wherein selecting said victim way for said selected victim set comprises:
   selecting said victim way using a predetermined replacement algorithm.

18. The method of claim 15 wherein selecting said victim way for said victim set comprises:
   selecting said victim way using said stored next way pointer.

19. The method of claim 15 further comprising:
   incrementing to a next selected victim set, unless said line is a last line in said new trace.

20. The method of claim 15 wherein selecting said victim set from said sequentially accessed memory comprises:
   selecting said victim set from a sequentially accessed trace cache.

21. The method of claim 20 wherein selecting said victim set from said sequentially accessed trace cache comprises:
   selecting said victim set from a plurality of victim sets in said sequentially accessed trace cache using a next line instruction pointer.

22. A machine-readable medium having stored thereon a plurality of executable instructions to perform a method comprising:
   selecting a victim set from a sequentially accessed memory;
   selecting a victim way for said selected victim set;
   reading a next way pointer from a trace line of a trace currently stored in said selected victim way, if said selected victim way has said next way pointer;
   writing a next line of said new trace into said selected victim way over said trace line of said currently stored trace; and
   storing said next way pointer, if said next line of said new trace is not a last line of said new trace.

23. The machine-readable medium of claim 22 wherein selecting said victim set comprises:
   selecting said victim set using a next line instruction pointer.

24. The machine-readable medium of claim 22 wherein selecting said victim way for said selected victim set comprises:
   selecting said victim way using a predetermined replacement algorithm.

25. The machine-readable medium of claim 22 wherein selecting said victim way for said selected victim set comprises:
   selecting said victim way using said stored next way pointer.

26. The machine-readable medium of claim 22 further comprising:
   incrementing to a next selected victim set, unless said line is a last line in said new trace.

27. The machine-readable medium of claim 22 wherein selecting said victim set from said sequentially accessed memory comprises:
   selecting said victim set from a sequentially accessed trace cache.

28. The machine-readable medium of claim 27 wherein selecting said victim set from said sequentially accessed trace cache comprises:
   selecting said victim set from a plurality of victim sets in said sequentially accessed trace cache using a next line instruction pointer.

29. A processor comprising:
   an execution component;
   a front end component coupled to said execution component, said front end component to provide instructions to said execution component; and
   a retirement component coupled to said execution component to receive results from the execution of said provided instructions, said front end component including a machine-readable medium having stored thereon a plurality of executable instructions to perform a method comprising:
      selecting a victim set from a sequentially accessed memory;
      selecting a victim way for said selected victim set;
      reading a next way pointer from a trace line of a trace currently stored in said selected victim way, if said selected victim way has said next way pointer;
      writing a next line of said new trace into said selected victim way over said trace line of said currently stored trace; and
         forcing a replacement algorithm of a next victim set to select a next victim way for the next victim set using said next way pointer, if said trace line of said currently stored trace is not an active trace tail line.

30. The processor of claim 29 further comprising:
   a cache memory coupled to said execution component.

31. The processor of claim 29 wherein said execution component is to execute said provided instructions out-of-order of an original program order.

32. The processor of claim 29 wherein said machine-readable medium comprises a sequentially accessed memory.

33. The processor of claim 29 wherein selecting said victim set comprises:
   selecting said victim set using a next line instruction pointer.

34. The processor of claim 29 wherein selecting said victim way for said selected victim set comprises:
   selecting said victim way using a predetermined replacement algorithm.

35. A computer system comprising:
   a memory to provide program instructions; and
   a processor coupled to said memory to receive and execute said program instructions, said processor including:
      an execution component;
      a front end component coupled to said execution component, said front end component to provide instructions to said execution component; and
      a retirement component coupled to said execution component to receive results from the executing of said provided instructions, said front end component including a machine-readable medium having stored thereon a plurality of executable instructions to perform a method including:

selecting a victim set from a sequentially accessed memory;

selecting a victim way for said selected victim set;

reading a next way pointer from a trace line of a trace currently stored in said selected victim way, if said selected victim way has said next way pointer;

writing a next line of said new trace into said selected victim way over said trace line of said currently stored trace; and forcing a replacement algorithm of a next victim set to select a next victim way for the next victim set using said next way pointer, if said trace line of said currently stored trace is not an active trace tail line.

36. The computer system of claim 35 further comprising: a cache memory coupled to said execution component.

37. The computer system of claim 35 wherein said execution component is to execute said instructions out-of-order of an original program order.

38. The computer system of claim 35 wherein said machine-readable medium comprises a sequentially accessed memory.

39. The computer system of claim 35 wherein selecting said victim set comprises:

selecting said victim set using a next line instruction pointer.

40. The computer system of claim 35 wherein selecting said victim way for said selected victim set comprises:

selecting said victim way using a predetermined replacement algorithm.

* * * * *